United States Patent
Kumada et al.

Patent Number: 5,620,262
Date of Patent: Apr. 15, 1997

[54] SLIDING BEARING

[75] Inventors: Yoshio Kumada; Katsuyuki Hashizume; Soji Kamiya, all of Toyota, Japan

[73] Assignee: Taiho Kogyo Co., Ltd., Toyota, Japan

[21] Appl. No.: 549,725

[22] PCT Filed: Mar. 17, 1995

[86] PCT No.: PCT/JP95/00466

§ 371 Date: Nov. 13, 1995

§ 102(e) Date: Nov. 13, 1995

[87] PCT Pub. No.: WO95/25908

PCT Pub. Date: Sep. 28, 1995

[30] Foreign Application Priority Data

Mar. 18, 1994 [JP] Japan ................................ 6-73961

[51] Int. Cl.⁶ .................................................... F16C 33/24
[52] U.S. Cl. ........................................... 384/283; 384/276
[58] Field of Search .................................. 384/276, 283, 384/291, 292

[56] References Cited

U.S. PATENT DOCUMENTS

| | | | |
|---|---|---|---|
| 4,400,099 | 8/1983 | Ehrentraut | 384/283 |
| 4,538,929 | 9/1985 | Ehrentraut et al. | 384/120 |
| 4,561,787 | 12/1985 | Ehrentraut et al. | 384/295 |
| 4,606,653 | 8/1986 | Ehrentraut et al. | 384/283 |
| 5,071,263 | 12/1991 | Kamiya et al. | 384/284 |
| 5,116,144 | 5/1992 | Kamiya et al. | 384/291 |
| 5,238,311 | 8/1993 | Katou et al. | 384/288 |

FOREIGN PATENT DOCUMENTS

| | | |
|---|---|---|
| 385822B | 5/1988 | Australia . |
| 0155257B1 | 9/1985 | European Pat. Off. . |
| 0155257A2 | 9/1985 | European Pat. Off. . |
| 60-205014 | 10/1985 | Japan . |
| 63-6215 | 1/1988 | Japan . |
| 63-30619 | 2/1988 | Japan . |
| 63-11530 | 3/1988 | Japan . |
| 2-142921 | 6/1990 | Japan . |
| 4-39461 | 9/1992 | Japan . |
| 5-6412 | 2/1993 | Japan . |
| 5-8337 | 3/1993 | Japan . |
| 6-19850 | 5/1994 | Japan . |

*Primary Examiner*—Thomas R. Hannon
*Attorney, Agent, or Firm*—Flynn, Thiel, Boutell & Tanis, P.C.

[57] ABSTRACT

Sliding bearing 1 comprises a bearing alloy layer 2 having peaks of a height h, an intermediate layer 3 of a thickness y, and an overlay layer 4 having a thickness t at the top of the peak. The parameters h, y and t are chosen in a range which satisfies the inequalities: $1 \leq h \leq 8$ (1), $0 < y \leq 2$ (2) and $0.7h \leq t \leq 2h$ (3). When a shaft journalled has a diameter D, the peak height h preferably satisfies the following inequality: $0.5D/10,000 \leq h \leq 1.25D/10,000$ (4). In these inequalities, h, y, t and D are represented in unit of μm. This choice improves the initial seizure resistance, the seizure resistance upon abrasion of the overlay layer and the wear resistance.

8 Claims, 4 Drawing Sheets

FIG.5

| | peak height (μm) | | | thickness of intermediate layer (μm) | | | thickness of overlay layer (μm) | | | kind of bearing alloy | kind of overlay layer | abrasion of bearing inner diameter from 2.1 to 5.25 | surface pressure at seizure MPa | surface pressure at seizure immediately upon use MPa | shaft diameter D over peak height (μm) |
|---|---|---|---|---|---|---|---|---|---|---|---|---|---|---|---|
| | ranges 1 to 8.3 | ranges 3 to 6 | | ranges 0 to 2.0 | ranges 0.2 to 0.5 | | (0.7~2)h | (1~15)h | | | | | | | |
| 1 | O | X | 1.2 | X | O | 0.1 | X | O | 2 | A | D | 2.5 | 60 | 65 | X |
| 2 | X | O | 3 | – | – | – | X | O | 3 | A | D | 4 | 70 | 80 | O |
| 3 | X | O | 3 | O | X | 0.6 | X | O | 3 | A | D | 3.8 | 70 | 80 | O |
| 4 | X | O | 3 | O | X | 1 | X | O | 3 | A | D | 3.8 | 65 | 80 | O |
| 5 | X | O | 3 | O | X | 2 | X | O | 3 | A | D | 3.5 | 60 | 70 | O |
| 6 | X | O | 4.5 | X | O | 0.3 | X | O | 3.5 | B | C | 4 | 55 | 60 | O |
| 7 | X | O | 4.5 | X | O | 0.3 | X | O | 4.5 | B | C | 4.5 | 65 | 70 | O |
| 8 | X | O | 4.5 | X | O | 0.3 | O | X | 6.5 | B | C | 7 | 75 | 85 | O |
| 9 | X | O | 4.5 | X | O | 0.3 | X | O | 9 | B | C | 9 | 70 | 85 | O |
| 10 | X | O | 5 | X | O | 1 | X | O | 6 | B | C | 7 | 70 | 80 | O |
| 11 | X | O | 6 | X | O | 0.6 | O | X | 5 | A | C | 5.5 | 75 | 75 | O |
| 12 | O | X | 7.8 | X | X | 2 | O | X | 5.5 | A | C | 7 | 60 | 65 | X |
| a | X | O | 3 | X | X | 3.5 | X | X | 3 | A | D | 3.3 | 40 | 65 | O |
| b | X | O | 3.5 | X | O | 1 | X | X | 12 | A | D | 11.5 | 70 | 80 | O |
| c | X | O | 4.5 | X | X | 3.5 | X | X | 3 | A | D | 3.5 | 35 | 50 | O |
| d | X | O | 4.5 | X | O | 0.3 | X | X | 3 | B | C | 4.5 | 55 | 55 | O |
| e | X | O | 4.5 | X | O | 0.5 | X | X | 3.5 | B | C | 4 | 50 | 50 | X |
| f | O | X | 1 | X | X | 2 | X | X | 0.5 | B | C | 1.2 | 45 | 45 | X |
| g | X | O | 4.5 | X | X | 0.3 | X | X | 12 | B | C | 14 | 75 | 90 | O |
| h | X | X | 10 | X | O | 2 | X | X | 5 | B | C | 7 | 35 | 40 | X |

FIG.6

| | bearing inner diameter (mm) | peak height (μm) | abrasion of bearing (mm) | penetrating sound | seizure resistance upon abrasion of overlay layer (MPa) |
|---|---|---|---|---|---|
| 1 | 40 | 2(0.5D) | 4 | good | 65 |
| 2 | 40 | 4(1.0D) | 5 | good | 75 |
| 3 | 40 | 5(1.25D) | 7 | fair | 80 |
| 4 | 50 | 2.5(0.5D) | 4.5 | good | 70 |
| 5 | 50 | 5(1.0D) | 7.5 | fair | 80 |
| 6 | 50 | 6.2(1.24D) | 9.5 | fair | 85 |
| 7 | 60 | 3(0.5D) | 5 | good | 70 |
| 8 | 60 | 7(1.17D) | 12 | good | 70 |
| 9 | 80 | 8(1.0D) | 15 | good | 75 |
| | | | | | |
| a | 40 | 1(0.25D) | 3 | good | 40 |
| b | 40 | 7(1.75D) | 12 | not good | 65 |
| c | 50 | 7(1.4D) | 13 | not good | 75 |

SLIDING BEARING

TECHNICAL FIELD

The invention relates to a sliding bearing, and more particularly, to a sliding bearing including a bearing alloy layer, an intermediate layer and an overlay layer.

BACKGROUND

A sliding bearing is known in the art including a bearing alloy layer having a number of circumferentially extending annular grooves, which are axially spaced apart, formed in its inner peripheral surface, with a circumferentially extending peak defined between a pair of axially adjacent annular grooves, an intermediate layer which coats the surface of the bearing alloy layer, and an overlay layer which coats the surface of the intermediate layer, the arrangement being such that when the overlay layer and the intermediate layer are partly abraded beginning from the surface of the overlay layer, the overlay layer and the intermediate layer which remain within recesses of the annular grooves as well as the peaks of the bearing alloy layer become exposed (See Japanese Laid-Open Patent Application No. 205,014/1985).

With a sliding bearing thus constructed, when the overlay layer and the intermediate layer are partly abraded beginning from the surface of the overlay layer, the overlay layer and the intermediate layer which remain within the recesses of the annular grooves as well as the peaks of the bearing alloy layer become exposed, thus preventing the intermediate layer from being extensively and immediately exposed as occurring in a sliding bearing of the same kind, but which is not provided with annular grooves. In this manner, a drastic reduction in the seizure resistance which may be caused by an extensive exposure of the intermediate layer can be effectively prevented.

However, according to the cited Application, it is described that the depth of the annular groove or the height of the peak be equal to or greater than one and one-half times the thickness of the intermediate layer and be equal to or greater than 5 μm in order to achieve the intended effect.

DISCLOSURE OF THE INVENTION

However, as the results of various tests conducted while changing the thickness of the overlay layer and the diameter of a rotating shaft which is journaled by the sliding bearing, in addition to considering the relationship between the peak height and the thickness of the intermediate layer, it is found that an initial seizure resistance which is excellent over the prior art as well as excellent results in respects of the seizure resistance obtained upon abrasion of the overlay layer and the wear resistance are obtained under given conditions.

Accordingly, the invention provides a sliding bearing which exhibits an excellent performance in respects of the initial seizure resistance, the seizure resistance upon abrasion of the overlay layer as well as the wear resistance.

Specifically, the invention relates to a sliding bearing including a bearing alloy layer having a number of circumferentially extending annular grooves, spaced apart in the axial direction, formed in its inner peripheral surface, with a circumferentially extending peak defined between each pair of axially adjacent annular grooves, an overlay layer which coats the surface of the bearing alloy layer, and an overlay layer which coats the surface of the intermediate layer, the arrangement being such that when the overlay layer and the intermediate layer are partly abraded beginning from the surface of the overlay layer, the overlay layer and the intermediate layer which remain in recesses of the annular grooves as well as the peaks of the bearing alloy layer become exposed.

A sliding bearing provided in accordance with the invention is characterized in that denoting the peak height by h, the thickness of the intermediate layer by y and the thickness of the overlay layer at the top of the peak by t, these parameters satisfy the following requirements defined by inequalities:

$$1 \leq h \leq 8 \quad (1)$$

$$0 < y \leq 2 \quad (2)$$

$$0.7h \leq t \leq 2h \quad (3)$$

where h, t and y are measured in units of μm.

More preferably, these parameters satisfy the following requirements, which are effective in providing a further enhanced bearing performance:

$$3 \leq h \leq 6 \quad (1')$$

$$0 < y \leq 0.5 \quad (2')$$

$$h \leq t \leq 1.5h \quad (3')$$

Additionally, denoting the diameter of a rotating shaft which is journaled by the sliding bearing by D, it is desirable that the peak height h and the diameter D of the shaft satisfy the following requirement:

$$0.5D/10,000 \leq h \leq 1.25D/10,000 \quad (4)$$

where D is again measured in units of μm.

As a result of the described requirements imposed by the present invention, an initial seizure resistance, a seizure resistance upon abrasion of the overlay layer as well as a wear resistance, which are superior to the prior art sliding bearing, are obtained, as will be demonstrated by the results of tests conducted, which will be described later.

BRIEF DESCRIPTION OF THE DRAWINGS

FIG. 5 is a chart indicating results of tests which illustrate the initial wear resistance, the seizure resistance upon abrasion of the overlay layer 4 and the wear resistance; and FIG. 6 is a chart indicating results of tests illustrating the wear resistance, the occurrence of striking sound, and the seizure resistance upon abrasion of the overlay layer 4.

BEST MODE OF CARRYING OUT THE INVENTION

Figure 1:
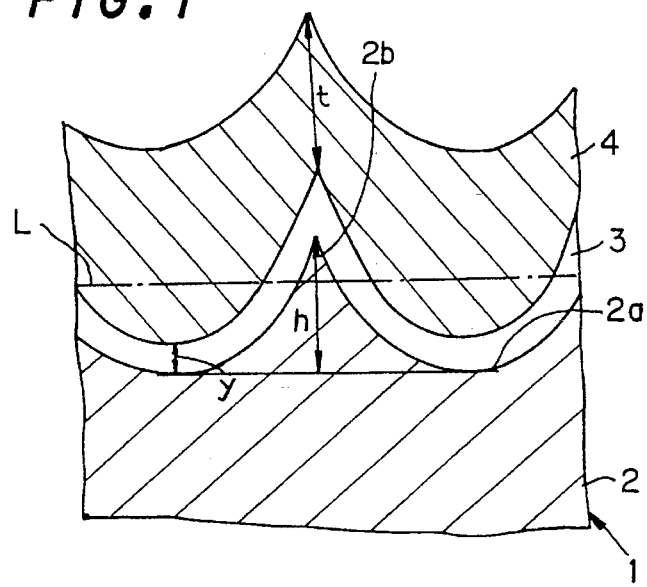
FIG. 1 is an axial cross section of a sliding bearing 1 according to the invention.

Referring to the drawings for a description of several embodiments of the invention, FIG. 1 is an enlarged cross section of a sliding bearing 1 which is formed in the configuration of a semi-cylinder or cylinder. The sliding bearing 1 includes a bearing alloy layer 2 disposed on a backing, not shown, and a helical annular groove 2a is formed in the inner peripheral surface of the alloy layer 2 and extends circumferentially, thus defining a circumferentially extending peak 2b between a pair of axially adjacent annular grooves 2a.

The surface of the bearing alloy layer 2 is coated with an intermediate layer 3, which presents an uneven surface conforming to the uneven surface of the bearing alloy layer 3. The surface of the intermediate layer 3 is in turn coated with an overlay layer 4. The purpose of the intermediate layer 3 is to achieve a close adherence between the bearing alloy layer 2 and the overlay layer 4.

With the described arrangement, when the overlay layer 4 and the intermediate layer 3 are partly abraded beginning from the surface of the overlay layer 4, the overlay layer 4 and the intermediate layer 3 which remain within recesses of the annular grooves 2a as well as the peaks 2b of the bearing alloy layer 2 will become exposed, as suggested by a phantom line L shown in FIG. 1.

Figure 2:
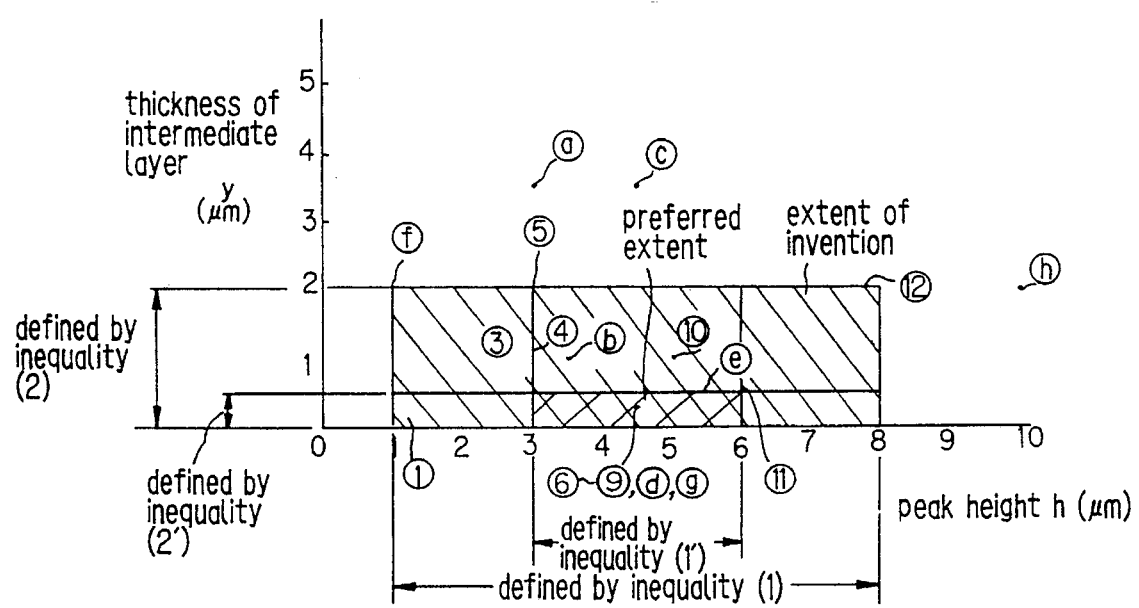
FIG. 2 graphically shows an extent required for a product of the invention.

FIG. 2 graphically illustrates a relationship between the height of the peak 2b and the thickness of the intermediate layer 3. When the height of the peak 2b is denoted by h and the thickness of the intermediate layer 3 by y, which are taken on the abscissa and the ordinate, respectively, the requirements of the invention can be graphically illustrated by an extent shown hatched in FIG. 2, which are represented by the following inequalities:

$$1 \leq h \leq 8 \tag{1}$$

$$0 < y < 2 \tag{2}$$

where both h and y are measured in units of μm.

A more desirable extent of the invention are defined by the following inequalities and is illustrated by a cross-hatched area:

$$3 \leq h \leq 6 \tag{1'}$$

$$0 < y \leq 0.5 \tag{2'}$$

Figure 3:
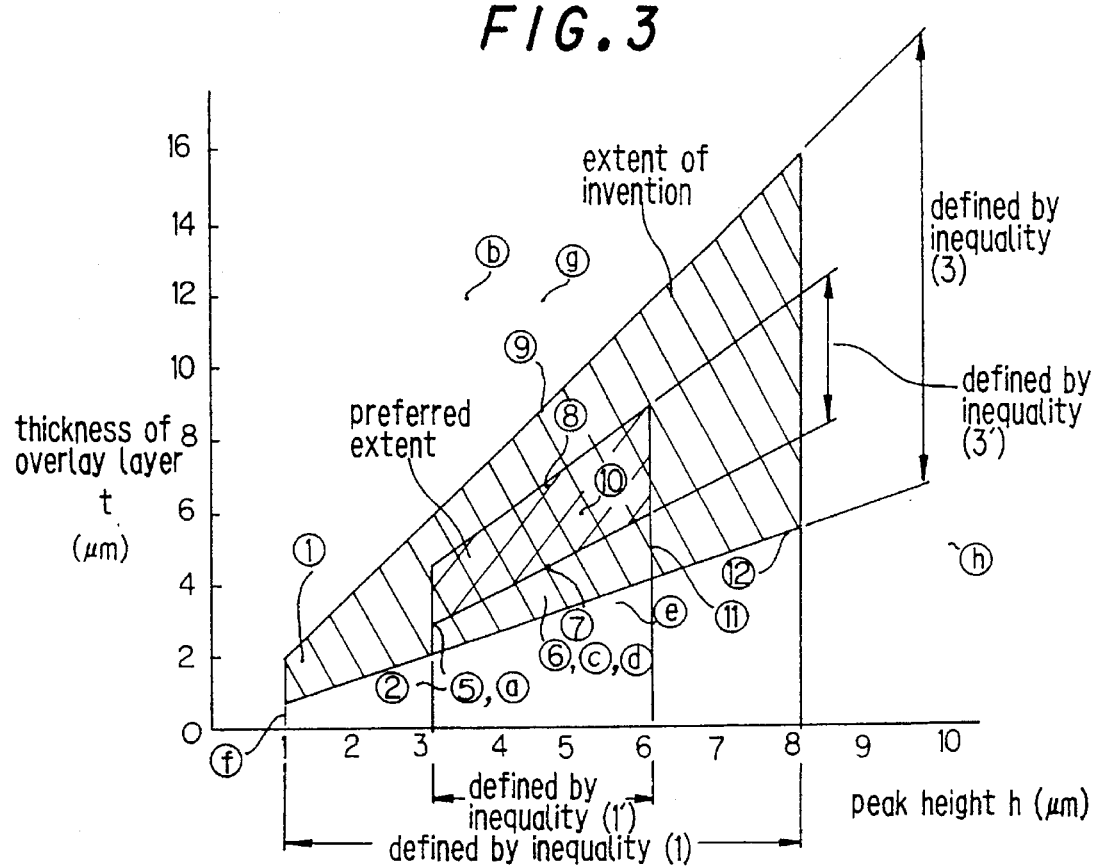
FIG. 3 graphically shows another extent which is required of a product of the invention.

FIG. 3 graphically illustrates a relationship between the height h of the peak 2b and the thickness of the overlay layer 4. Denoting the thickness of the overlay layer 4 at the top of the peak 2b by t and is taken on the ordinate to be plotted against the peak height h taken on the abscissa in a graphical illustration which is similar to that described above, the thickness t and the height h should be located according to the invention in an extent defined by the following inequalities (such extent being shown hatched in FIG. 3):

$$1 \leq h \leq 8 \tag{1}$$

$$0.7\,h \leq t \leq 2h \tag{3}$$

A more desirable extent is defined by the following inequalities and are shown as a cross-hatched area:

$$3 \leq h \leq 6 \tag{1'}$$

$$h \leq t \leq 1.5\,h \tag{3'}$$

Figure 4:
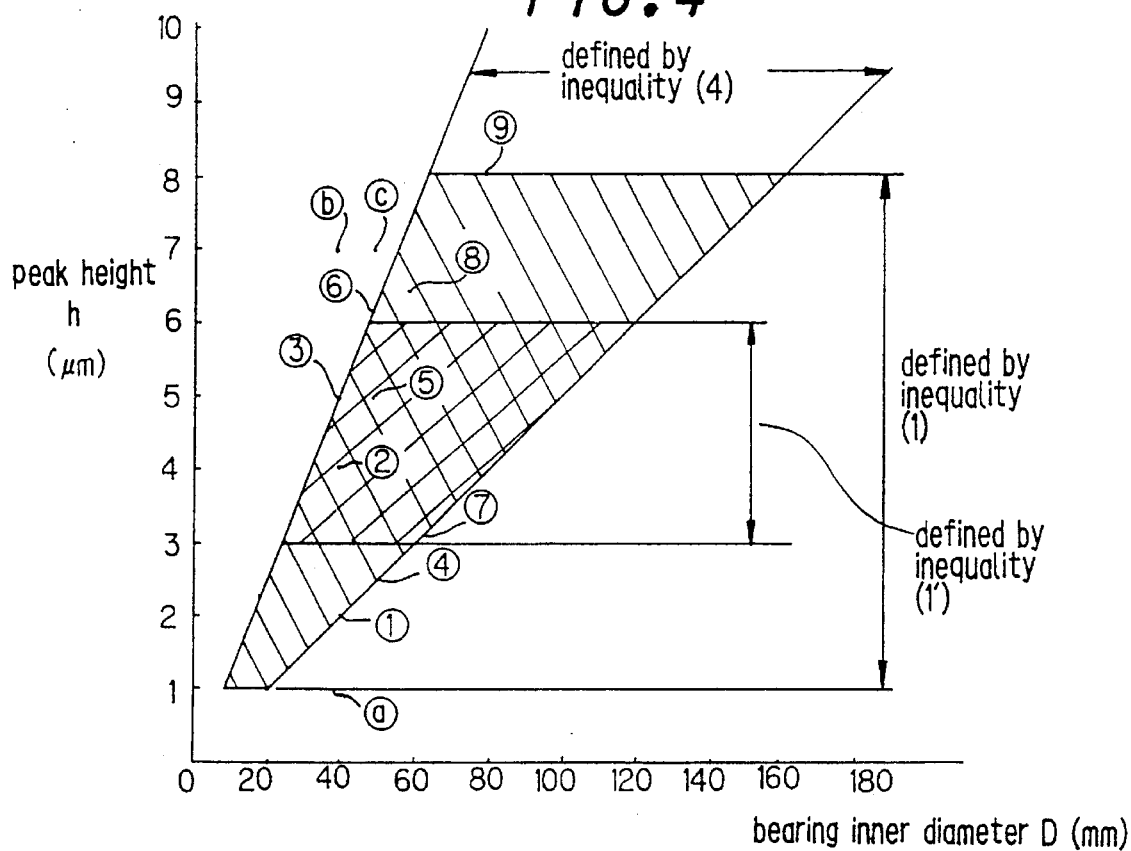
FIG. 4 graphically shows an additional extent which is also required of a product of the invention.

FIG. 4 graphically shows a relationship between the peak height h and the diameter D of a rotating shaft which is journaled by the sliding bearing according to the invention. When the peak height h is taken on the ordinate while the diameter D is taken on the abscissa, it is required in accordance with the invention that these parameters lie in an extent, shown hatched, which is defined by the following inequalities, in addition to satisfying the above requirements:

$$0.5D/10{,}000 \leq h \leq 1.25D/10{,}000 \tag{4}$$

A more desirable extent is indicated by a cross-hatched area.

The helical, annular grooves 2a have a pitch which is desirable to lie in a range from 0.1 to 0.4 mm, and more desirably, in a range from 0.15 to 0.3 mm. It will therefore be seen that the illustration in FIG. 1 is exaggerated, using a much enlarged scale in the vertical direction as compared to the scale used in the horizontal direction.

To illustrate the effect of the invention, results of tests conducted to examine the seizure resistance at the beginning of use of the sliding bearing 1, the seizure resistance upon abrasion of the overlay layer 4 and the wear resistance will be described.

In the chart shown in FIG. 5, samples 1 to 12 are products according to the invention while samples a to h are controls. Each sample used in these tests comprises a bearing alloy layer 2 comprising either an aluminium bearing alloy layer 2 such as Al—12 Sn—1.5 Pb—2.5 Si—1 Cu—0.2 Cr or copper bearing alloy layer 2 such as Cu—15 Pb—1.5 Sn, which is represented in percent by weight, and which is applied to a backing comprising SPCC by a pressure welding. Annular grooves 2a are formed in the surface of the alloy layer 2 with a pitch of 0.2 mm and to a required depth. Subsequently, Ni is applied to the surface of the alloy layer 2 to a thickness which is required to provide the intermediate layer 3, by electroplating. An overlay layer 4 either comprising Pb—3 Sn—5 In or comprising Sn is applied to the surface of the electroplated Ni layer to a given thickness, also by electroplating.

In the chart shown in FIG. 5, a bearing alloy layer 2 which comprises aluminium alloy is denoted by A, and that comprising copper alloy by B, an overlay layer comprising Pb alloy by C, and an overlay layer comprising Sn by D for purpose of abbreviation.

The test has been conducted under the following conditions:

Testing machine: hydraulic dynamic load testing machine of journal type
Lubricant: SAE 5W—30
Oil temperature: 160° C.
Lubricant: SAU 5W—30
Feed rate: 0.5 liter/min
Mating shaft: S50C hardened, hardness of HV 500 to 600, shaft diameter of 42 mm, and shaft roughness of 1 μm Rz.

For a shaft diameter D of 42 mm, the height h of the peak 2b which satisfies the requirements of the inequality (4) will be defined as follows:

$$2.1\ \mu m \leq h \leq 5.25\ \mu m$$

In a wear resistance test, the test is run for 50 hours while maintaining a number of revolutions of 3,000 rpm and while changing the load from 0 to 50 MPa, and after the test, a change in the wall thickness of the bearing has been determined.

A test which determines the seizure resistance obtained upon abrasion of the overlay layer 4 takes place subsequent to the wear resistance test. The number of revolutions is increased from 0 to 6,000 rpm under a static load of 5 MPa, and subsequently the machine is run for 10 minutes with a load which is increased from 5 MPa to 10 MPa while maintaining the same number of revolutions. Thereafter, the load is stepwise increased by 10 MPa at an interval of 10 minutes to determine the surface pressure where a seizure occurs.

A test which determines the seizure resistance at the beginning of use of the sliding bearing 1 takes place in the similar manner as the test which determines the seizure resistance obtained upon abrasion of the overlay layer 4, except the preceding wear resistance test is omitted, thus determining a surface pressure where a seizure occurs.

As indicated by the results of tests shown in the chart of FIG. 5, the products prepared according to the invention exhibit excellent performance in any respect of the initial seizure resistance, the seizure resistance upon abrasion of the overlay layer 4 and the wear resistance. More specifically, with respect to the initial seizure resistance, it is required that the surface pressure at which a seizure occurs be equal to or greater than 60 MPa since it is now before the running-in achieves a stabilized area of contact between the sliding bearing and a rotary shaft after the initial non-uniformity or localization of points of contact therebetween has been removed. When the seizure resistance upon abrasion of the overlay layer 4 is to be determined, a sufficient running-in has already been achieved to establish a stabilized area of contact between the sliding bearing and the rotary shaft, and hence a surface pressure equal to or greater than 50 MPa at which a seizure is to occur is sufficient for practical purpose. Where the shaft diameter is equal to 42 mm, an abrasion of an amount equal to or greater than 10 μm results in an increased magnitude of clearance, giving rise to the likelihood that a striking sound may be developed. Accordingly, the abrasion must be less than such magnitude. Samples 1 to 12 according to the invention satisfy such requirements, while the controls a to h fail to satisfy either one of these requirements.

FIG. 6 is a chart indicating results of tests conducted to determine the wear resistance, the occurrence of striking sound and the seizure resistance of various samples and controls for varying values of the height h of the peak 2b and the shaft diameter D. In FIG. 6, samples 1 to 9 represent products according to the invention, while controls a to c are those which lie outside the extent of the invention.

Each sample used in the present test comprises a bearing alloy layer 2 of Cu—15 Pb—1.5 Sn applied to a backing comprising SPCC by a pressure welding. Annular grooves 2a are formed in the surface of the bearing alloy layer 2 to a required depth with a pitch of 0.2 mm. Then a nickel is electroplated to a thickness of 1 μm to the surface of the bearing alloy layer 2 to provide an intermediate layer 3. An overlay layer 4 comprises Pb—3 Sn—5 In which is applied by electroplating to the surface of the electroplated nickel layer to a thickness of 1.2 h.

During the tests of the wear resistance and the occurrence of striking sound, an actual engine is used to run for an interval of 200 hours, and then the occurrence of striking sound is examined. Subsequently, the engine is disassembled to examine the abrasion of the bearing. The occurrence of striking sound is evaluated at three levels of "good", "fair" and "not good".

The seizure resistance has been tested according to the following conditions:

Testing machine: seizure testing machine of journal type
Peripheral speed: 2.77 m/s
Surface pressure: 10 MPa/45 min, gradually increased by STEP
Lubricant oil: 7.5 W-30, SE class engine oil
Oil temperature: 140°±1° C.
Oil clearance: 25±5 μm
Shaft material: S 45 C±hardening
Shaft hardness: 550±50 HV 1
Shaft surface roughness: 0.5±0.1 μm Rz.

A test procedure comprises an initial shakedown which runs the machine for one hour with a surface pressure of 5 MPa, then increasing the surface pressure to 10 MPa and subsequently stepwise increasing the surface pressure by 10 MPa at an interval of 45 minutes while recording a frictional torque and a back temperature of the bearing. When the frictional torque increases rapidly and exceeds a value of 10.8 N.m, the occurrence of a seizure is determined and a corresponding surface pressure is chosen as the surface pressure at which a seizure occurred. If the seizure occurs during the time the load is being increased, a median value across the range is chosen as the surface pressure at which the seizure occurred. The lubrication takes place by an oil bath, and the testing instrument is completely immersed in the oil bath. The temperature of the lubricant oil is controlled by a separate oil feeding unit, and the lubricant is circulated through the oil bath at a rate of 1 dm$^3$/min while maintaining the oil bath temperature at 140° C.

As indicated by the results of tests shown in the chart of FIG. 6, samples 1 to 9 according to the invention exhibit an excellent performance in any respect of the wear resistance, the occurrence of striking sound and the seizure resistance upon abrasion of the overlay layer 4. By contrast, turning to the controls a to c, it is noted that the control a provides an excellent performance with respect to the wear resistance and the occurrence of striking sound, but its seizure resistance upon abrasion of the overlay layer 4 is degraded. Similarly, the controls b and d provide an excellent performance in respect of the seizure resistance upon abrasion of the overlay layer 4, but exhibit a poor wear resistance as is the occurrence of a striking sound.

It is noted that the products according to the invention which are contained in the extent defined by the inequality (1') shown in FIG. 2 provide an excellent results in respect of the wear resistance and the initial seizure resistance at the beginning of use. The products according to the invention which are contained in the extent defined by the inequality (2') exhibit an excellent result in respect of the seizure resistance upon abrasion of the overlay layer 4. Accordingly, it is concluded that the products according to the invention which are contained in the extent which is shown cross-hatched in FIG. 2 provide an excellent result in respect of the wear resistance, the initial seizure resistance, and the seizure resistance upon abrasion of the overlay layer 4.

For a bearing of an internal combustion engine, the disadvantages occur that the seizure resistance is degraded when the height h of the peak 2b is less than 0.5 D or that a clearance increases to result in an increased amount of engine penetrating sound when the height h exceeds 1.25 D, depending on the size of the engine.

The purpose of the intermediate layer 3 is to achieve the close adherence between the bearing alloy layer 2 and the overlay layer 4 as mentioned, but may be omitted as desired. Specifically, where the bearing alloy layer 2 comprises a copper system, a close adherence of sufficient strength can be achieved between the bearing alloy layer 2 and the overlay layer 4, thus allowing the intermediate layer 3 to be omitted. When the bearing alloy layer 2 comprises an aluminium system, the intermediate layer 3 may again be omitted if the sufficient strength of close adherence between the bearing alloy layer 2 and the overlay layer 4 can be achieved.

The bearing alloy layer 2 which is used in the present invention may comprise Al-system alloy bearing material other than that used in the described samples or Cu-system alloy bearing material such as Cu—23 Pb—3 Sn or Cu—1 Ag. The intermediate layer 3 preferably comprises Ni, Cu, Cr, or Fe, which is applied by a wet or a drying plating process. In addition to those used in the described samples, the overlay layer 4 may comprise Pb, alloy material such as Pb—10 Sn—2 Cu or pure Sn or Sn alloy material. Additionally, it may comprise synthetic resin material comprising polyimide added with $MoS_2$ or graphite.

What is claimed is:

1. A sliding bearing comprising a bearing alloy layer having a plurality of circumferentially extending annular grooves formed in its inner peripheral surface which are axially spaced apart from each other to define a circumferentially extending peak between each pair of axially adjacent annular grooves, an intermediate layer which coats the surface of the bearing alloy layer, and an overlay layer which coats the surface of the intermediate layer, whereby sufficiently abrading the overlay layer and the intermediate layer, beginning from the surface of the overlay layer, exposes the portions of the overlay layer and the intermediate layer which remain in recesses formed by the annular grooves as well as the peaks of the bearing alloy layer, wherein the peak of the bearing alloy layer has a height h, the intermediate layer has a thickness y and the overlay layer has a thickness t at the top of the peak, the parameters h, y and t satisfying the following inequalities:

$$1 \leq h \leq 8 \quad (1)$$

$$0 < y \leq 2 \quad (2)$$

$$0.7 h \leq t \leq 2 h \quad (3)$$

where h, y and t are represented in unit of μm.

2. Sliding bearing according to claim 1 in which the parameters satisfy the following inequalities:

$$3 \leq h \leq 6 \quad (1')$$

$$0 < y \leq 0.5 \quad (2')$$

$$h \leq t \leq 1.5 h \quad (3').$$

3. Sliding bearing according to claim 1 in which a rotating shaft which is journalled by the sliding bearing has a diameter D, represented in unit of μm, and the height h of the peak is related to the diameter of the shaft as follows:

$$0.5D/10,000 \leq h \leq 1.25D/10,000 \quad (4).$$

4. Sliding bearing according to claim 1 in which a pitch between adjacent peaks is in a range from 0.1 to 0.4 mm.

5. Sliding bearing according to claim 4 in which the pitch is in a range from 0.15 to 0.3 mm.

6. Sliding bearing according to claim 1 in which the bearing alloy layer comprises a material selected from the group consisting of Al alloy bearing material and Cu alloy bearing material.

7. Sliding bearing according to claim 1 in which the intermediate layer comprises a plating of a material selected from the group consisting of Ni, Cu, Cr and Fe.

8. Sliding bearing according to claim 1 in which the overlay layer comprises a material selected from the group consisting of Pb alloy material, pure Sn, Sn alloy material and synthetic resin material.

* * * * *